US008735466B2

(12) United States Patent
Schutyser et al.

(10) Patent No.: US 8,735,466 B2
(45) Date of Patent: May 27, 2014

(54) FILM FORMING COMPOSITION COMPRISING MODIFIED NANOPARTICLES AND MODIFIED NANOPARTICLES FOR USE IN FILM FORMING COMPOSITIONS

(75) Inventors: Jan Andre Jozef Schutyser, Dieren (NL); Cornelis Adrianus Maria Vijverberg, Halsteren (NL); Richard Hendrikus Gerrit Brinkhuis, Zwolle (NL)

(73) Assignee: Nuplex Resins B.V., Bergen op Zoom (NL)

( * ) Notice: Subject to any disclaimer, the term of this patent is extended or adjusted under 35 U.S.C. 154(b) by 744 days.

(21) Appl. No.: 12/521,530

(22) PCT Filed: Dec. 21, 2007

(86) PCT No.: PCT/EP2007/064518
§ 371 (c)(1),
(2), (4) Date: Sep. 28, 2009

(87) PCT Pub. No.: WO2008/080908
PCT Pub. Date: Jul. 10, 2008

(65) Prior Publication Data
US 2010/0317788 A1 Dec. 16, 2010

(30) Foreign Application Priority Data
Dec. 28, 2006 (EP) .................................. 06127312

(51) Int. Cl.
*C08K 9/12* (2006.01)
*C09C 1/30* (2006.01)

(52) U.S. Cl.
USPC ........................... 523/205; 428/404; 428/407

(58) Field of Classification Search
USPC .................................. 523/205; 428/404, 407
See application file for complete search history.

(56) References Cited

U.S. PATENT DOCUMENTS

| | | | |
|---|---|---|---|
| 3,479,328 A | 11/1969 | Nordstrom et al. | |
| 4,311,622 A | 1/1982 | Buter | |
| 4,332,354 A * | 6/1982 | deMonterey et al. | 241/16 |
| 5,102,763 A * | 4/1992 | Winnik et al. | 430/108.24 |
| 5,272,201 A * | 12/1993 | Ma et al. | 524/505 |
| 5,663,240 A | 9/1997 | Simeone | |
| 5,681,877 A * | 10/1997 | Hosotte-Filbert et al. | 524/32 |
| 6,660,793 B1 * | 12/2003 | McIntyre et al. | 524/441 |
| 2004/0106715 A1 * | 6/2004 | Legrand et al. | 524/425 |
| 2007/0026143 A1 | 2/2007 | Campbell et al. | |

FOREIGN PATENT DOCUMENTS

| | | |
|---|---|---|
| CN | 1462773 A | 12/2003 |
| CN | 554713 A | 12/2004 |
| EP | 192304 A1 | 8/1986 |
| EP | 1295922 A2 | 3/2003 |
| EP | 17171278 A | 11/2006 |
| JP | 2002031713 A * | 1/2002 |
| NL | 7613121 C | 5/1978 |
| WO | 9322355 A1 | 11/1993 |
| WO | 03102089 A1 | 12/2003 |
| WO | 2005070820 A1 | 8/2005 |
| WO | 2005119359 A1 | 12/2005 |
| WO | 2006024669 A1 | 3/2006 |
| WO | 2006114181 A | 11/2006 |
| WO | 2006114420 A1 | 11/2006 |
| WO | 2006117476 A1 | 11/2006 |

OTHER PUBLICATIONS

Machine translation of JP 2002-031713 A, Jan. 31, 2002.*
Database WPI Week 200530 Derwent Publications Ltd., London, GB: AN 2005-285964 XP002442728.
Database WPI Week 200461 Derwent Publications Ltd., London, GB: AN 2004-626486 XP002442729.
K. Matyjaszewski, J. Xia, Chem. Rev. 2001, 101, p. 2910-2990.
C.J. Hawker, A.W. Bosman, E. Hart, Chem Rev. 2001,101, 3661-3688.
G. Moad et al in Polym. Int. 2000, 49, 993-1001.
S. Perrier, P. Takolpuckdee, J. Polym.Sci.Part A: Polym Chem. 2005, 43,5347-5393.
Stober et al, Journal of Colloid and Interface Science, vol. 26, pp. 62-69 (1968).

* cited by examiner

*Primary Examiner* — Vickey Nerangis
(74) *Attorney, Agent, or Firm* — Coraline J. Haitjema; David P. Owen; Hoyng Monegier LLP

(57) ABSTRACT

The present invention relates to a film forming composition comprising a resin and modified nanoparticles comprising nanoparticles and adsorbed thereon a segmented copolymer, preferably a segmented blockcopolymer, comprising an adsorbing segment and a hydrophobic surface active segment, wherein the adsorbing segment has one or more functional groups that adsorb on the nanoparticles and wherein the hydrophobic segment is more hydrophobic than the resin providing surface migration of the nanoparticles. The invention also relates to novel modified particles and the use of the specified segmented copolymer of specified modified particles in a film forming composition for imparting thereto improved surface properties such as scratch resistance.

7 Claims, No Drawings

FILM FORMING COMPOSITION COMPRISING MODIFIED NANOPARTICLES AND MODIFIED NANOPARTICLES FOR USE IN FILM FORMING COMPOSITIONS

CROSS-REFERENCE TO RELATED APPLICATIONS

This application is a 35 U.S.C. §371 national phase application of International Application Number PCT/EP2007/064518, filed Dec. 21, 2007, which was published in English on Jul. 10, 2008 as WO 2008/080908, and claims priority to European Patent Application No. 06127312.4, filed Dec. 28, 2006, the entire contents of both of which are incorporated by reference herein.

BACKGROUND OF THE INVENTION

1. Field of the Invention

The present invention relates to a film forming composition comprising a resin and modified nanoparticles. The nanoparticles are modified to improve surface migration of the nanoparticles in a film. The invention also relates to novel modified nanoparticles and to the use of modified nanoparticles in film forming compositions, in particular in clear coating compositions, for improving surface properties, in particular scratch resistance.

2. Description of the Related Art

WO 03/102089 describes nanoparticles modified with compounds that lower the surface tension. The nanoparticles are enriched at the surface of the coating. The particles are chemically modified, leading to a non-reversible covalent chemical bond, by using silane coupling agents such as the octyltriethoxysilane, perfluorooctyltriethoxysilane and reaction product of e.g. aminopropyltriethoxysilane and epoxy eicosane. Such covalent chemical treatments, however, are based on expensive silane chemicals. Moreover, during the chemical modification not all silane material is attached to the particles but remains in part—also as oligomers—dissolved in the solution of the modified nanoparticles. Further, during the storage slow reaction takes place of these oligomeric species containing reactive groups such as silanol groups which causes storage stability problems such as loss of clarity and viscosity increase of the dispersion. Such aged dispersion is not any more suitable for use in coatings especially not in clear coatings. Another disadvantage is that during the film formation and curing both the surface active particles and the remaining surface active unattached silane material will go in competition in migrating to the surface of the coating. The lower molecular weight silane species migrate faster due to the higher mobility.

PCT/EP2006/061826 describes nanoparticles chemically modified with a cross-linked polysiloxane. The particles are surface active yielding enrichment of the particles at the surface of the cured film-forming resin. The enrichment is shown with TEM (i.e. Transmission Electron Micrographs) and/or ToF-SIMS (i.e. Time-of-Flight Secondary Ion Mass Spectroscopy). The disadvantage of this modification is that it is relatively expensive.

PCT/US2005/018656 describes film forming compositions comprising crystalline nanoparticles such as alumina powder dispersed by means of a polymeric dispersant. The polymeric dispersant helps to disperse the nanoparticles to their primary particles size and prevents agglomeration. Upon extra addition of surface active chemicals, for example silicone or fluor types these dispersed nanoparticles migrate to the surface. The surface activity of the dispersed nanoparticles is said to be caused by the interaction of the surface active chemicals with the polymeric dispersant. This enables the migration of the nanoparticles to the surface of the coating and results in improved scratch resistance. A drawback of such approach is that it is cumbersome, critical and expensive due to the use of both dispersant and surface active agent. It is difficult to prevent that such surface active agent interferes with wetting or levelling agents that are usually added to a film forming composition for other purposes, for example to get a good film appearance.

There is still a need for a nanoparticle based additive for film-forming compositions, in particular coating compositions that enhances the scratch resistance of coatings and has less or none of the above described disadvantages of the prior art modified nanoparticles and that is simple to use and is inexpensive.

BRIEF SUMMARY OF THE INVENTION

According to the invention there is provided a film forming composition comprising a resin and modified nanoparticles comprising nanoparticles and adsorbed thereon a segmented copolymer, preferably a segmented blockcopolymer, comprising an adsorbing segment and a hydrophobic surface active segment, wherein the adsorbing segment has one or more functional groups that adsorb on the nanoparticles and wherein the hydrophobic segment is more hydrophobic than the resin providing surface migration of the nanoparticles.

With a resin it is meant a resin or a resin mixture comprising one or more resins forming the binder of the film-forming composition. Surface migration of the nanoparticles means migration of the nanoparticles from within the bulk of the composition towards a surface of a film of the film forming composition; in a coating on a substrate that is the surface opposite to the substrate. The surface migration occurs as the film (or coating) is still liquid and stops when the film is hardened, for example during solvent evaporation or curing. Evidence of surface migration is found in the form of an enrichment of nanoparticles at the surface of the film opposite to the substrate. The term "surface active" in "hydrophobic surface active segment" implies that the hydrophobic segment is more hydrophobic than the resin thus imparting surface migration properties to the modified nanoparticles.

The modified nanoparticles can be introduced as additive in a film-forming or coating composition in order to improve the scratch resistance thereof. The modification of nanoparticles is realized by adsorption of the surface active segmented copolymers resulting in modified nanoparticles with a low surface tension that during the formation of the coating or film migrate to the surface. With techniques such as SIMS or transmission electron microscope (TEM) it can be shown that such modified nanoparticles are present in enriched amounts at the surface of the coating. It was found that very good scratch resisting properties could be obtained in coatings for the first time without modification with—or separate addition of—the expensive silicone or fluor based surface active chemicals used in the prior art. Another advantage is that the segmented copolymer not only provides surface activity but also stability of the nanoparticle dispersion during storage in an organic solution or in the resin solution. The nanoparticles are also sterically stabilized by the segmented copolymer and very good scratch resistance properties could be obtained for the first time without a need for special measures to prevent agglomeration of the nanoparticles. The most preferred blockcopolymer modified nanosilica particles according to the invention permit the preservation of the clarity in clear organic coatings.

It was found that the modified nanoparticles have excellent properties for use in coating compositions to make pigment-free top coatings or clear coatings in the finishing of articles, for example motorcycles, cars, trains, buses, trucks, and aeroplanes. It was found that not only metal surfaces, but also plastic article surfaces can be coated with the coating compositions according to the invention EP1295922 reveals pigment dispersing resins comprising a macromonomer made by controlled structure polymerisation techniques and functional groups that can bind to pigment particles for improving dispersion of pigment particles in a dispersing medium (solvent). The pigment dispersing resins does not comprise a surface active hydrophobic segment, is not surface active and does not improve surface migration of particles in coatings or films. In particular, the prior art does not describe modified nanoparticles for improving the scratch resistance of a coating or film, in particular a clear coating.

WO2006/117476 describes mineral particle dispersions in an organic hydrophobic medium, in particular oils that are stabilized by amphiphilic block polymers containing groups for developing interactions with the surface of the particles, and a hydrophobic block having an affinity to the organic medium of the dispersion. The discussed particle dispersions address the problem of stably dispersing particles in a medium, preferably both polar and non-polar, in particular in cosmetic compositions. It does not describe the use of nanoparticles in film forming compositions, nor surface enrichment.

EP1295922 discusses a pigment dispersing resin having a weight-average molecular weight within a range of 1,000-150,000, which is obtained by copolymerizing a monomeric mixture comprising (a) a macromonomer obtained by polymerizing at least one ethylenically unsaturated monomer in the presence of a metal complex as a catalytic chain transfer agent, or an addition cleavage-type chain transfer agent and if necessary a radical polymerization initiator, which macromonomer having a resin acid value less than 50 mgKOH/g, and (b) at least one copolymerizable unsaturated monomer, wherein at least one monomer among the ethylenically unsaturated monomer(s) constituting said macromonomer (a) and the copolymerizable unsaturated monomer(s) (b) has a functional group selected from substituted or unsubstituted amino group, quaternary ammonium salt group, sulphonic group, phosphoric group and carboxyl group. The discussed technology does not describe nanoparticles in film forming compositions, WO2005/070820 and WO2006/114181 discuss polymer-modified nanoparticles, suitable as UV stabilisers in polymers, which may be obtained by a method with the steps a) production of an inverse emulsion containing one or several water-soluble precursors for the nanoparticles or a melt, from a statistical copolymer of one monomer with hydrophobic groups and at least one monomer with hydrophilic groups and b) the generation of particles as well as the use thereof for UV protection in polymers. The utilised copolymers are statistical copolymers. The present invention shows improved results in comparison to statistical copolymers as demonstrated in comparative example 9 of this application.

US2007/0026143 discusses a method of preparing an organosol of inorganic particles, comprising mixing an aqueous dispersion or sol of inorganic particles with an organic liquid and a polymer or oligomer having functionality that adsorbs onto the inorganic particles. Also discussed is a polymer composition or coating composition made by the method. The utilised polymers are random copolymers. The present invention shows improved results in comparison to random copolymers as demonstrated in comparative example 9 of this application.

In the segmented copolymer according to the invention the composition of the surface active hydrophobic segment is chosen in view of the composition of the resin in the envisaged film forming composition such that the hydrophobicity of the hydrophobic segment is higher than the hydrophobicity of the resin. Suitable monomers for the hydrophobic segment are C4 to C23 esters of methacrylic acid. The C4-C23 esters can be an alkyl, aryl, or alkyl-aryl esters comprising 4 to 23 carbon atoms but is preferably an alkyl ester group. Preferred monomers are C5 to C15 esters of methacrylic acid.

The hydrophobicity and hence the surface activity of the segmented copolymer (and the resulting modified nanoparticle) is adjustable by varying the relative amount of hydrophobic monomers like laurylmethacrylate and 2-ethyl-hexylmethacrylate over the amount of lower hydrophobic monomer such as butylmethacrylate. By adjusting the composition of the hydrophobic segment of the copolymer it is possible to impart a hydrophobicity that is greater than that of the resin. The hydrophobicity is tuned to be greater than that of the resin so that the particles on which the copolymer is adsorbed will migrate toward the surface of the coating composition. In this manner an enrichment of particles at the surface of the cured coating is achieved to impart scratch resistance thereto. The hydrophobicity of the hydrophobic segment should not be chosen too high to prevent incompatibility with the resin and agglomeration of the modified nanoparticles in the film forming composition. Good results were obtained in film forming compositions wherein the resin comprises a, preferably crosslinkable, acrylic and/or polyester resin and modified nanoparticles wherein the hydrophobic segment on the segmented blockcopolymer comprises 20 wt % to 90 wt % of C4 to C23 alkyl esters of (meth-)acrylic acid (based on the weight of the hydrophobic segment); preferably 10 wt % to 60 wt % of C6 to C23 alkyl esters of (meth-)acrylic acid, preferably 2-ethylhexylmethacrylate and/or laurylmethacrylate. (meth-)acrylic means acrylic and/or methacrylic with methacrylic being most preferred.

It is preferred that the segmented copolymer, as opposed to the prior art surface active additives, is essentially free of oligo- or polydimethylsiloxane and oligo- or polyfluor compounds. "Essentially free" means that the segmented copolymer ideally comprises 0 wt % of said, but may include preferably less than 5, more preferably less than 3, even more preferably less than 2 and most preferably less than 1 wt % of a hydrophobic alkyl terminated poly- or oligo-dimethylsiloxane- or fluor containing radical polymerizable monomer (wt % of Si or F over the total weight of the segmented copolymer). Most preferably the segmented copolymer is essentially entirely free of silicon and fluor atoms for reasons described above but mainly because these compounds are expensive.

It is further preferred that the segmented copolymer additionally comprises crosslinkable groups, preferably hydroxy groups, that can react with the resin, that is; with the resin or together with the resin with a crosslinking agent, in the film forming composition, such that after complete curing the modified nanoparticles are chemically bonded in the cured resin and participate in the network formation. Preferably the hydrophobic segment comprises crosslinkable groups.

The crosslinkable groups are preferably chosen different from the functional group in the adsorbing segment. In view of retaining both good surface migration enhancing properties and on the other hand bonding with the resin after curing, the segmented copolymer comprises crosslinkable groups, preferably hydroxy groups, in an amount between 0.5 and 35, but preferably less than 30 and more preferably less than 25% (percentage of monomers in the segmented copolymer having a reactive group). In case the hydrophobic segment comprises both hydrophobic monomers and hydroxy monomers the OH number is preferably between 0 to 100 mg KOH/g of the segmented copolymer. Examples of suitable hydroxy monomers are hydroxyethylmethacrylate, 1- or 2-hydroxypropylmethacrylate, hydroxybutylmethacrylate, caprolactone modified hydroxyethylmethacrylate available from Daicel Chemical Industry under the trade name Placcel FM and the 1:1 molar adduct of Cardura E10 with methacrylic acid. The inclusion of hydrophilic reactive groups in the hydrophobic segment of the segmented copolymer lowers the surface activity. To retain sufficient surface activity, the presence of hydrophilic reactive groups can be compensated by including besides the usual lower hydrophobic monomers (i.e. (meth)acrylic ester monomers wherein the ester group has 1-6 carbons) highly hydrophobic monomers like laurylmethacrylate and 2-ethyl-hexyl-methacrylate, preferably in an amount between 0.1 to 2 times the molar amount of the hydrophilic monomers. Highly hydrophobic monomers are: 2-ethylhexyl (meth)acrylate, lauryl(meth)acrylate, isobornyl (meth)acrylate, cyclohexyl(meth)acrylate, 3,3,5-trimethylcyclohexyl(meth)acrylate, isooctyl(meth)acylate, and isodecyl-(meth)acrylate, octadecyl methacrylate.

In case no hydrophilic groups, in particular hydroxy groups, are present in the segmented copolymer, sufficient surface activity is obtained for most film forming compositions if the hydrophobic segment comprises acrylic ester monomers wherein the ester group has 3-6 carbons. For example, good results are obtained using only C4 acryl ester. In case hydroxy containing monomers are present in amounts between 0 tot 100 mg KOH/g per segmented copolymer, the above mentioned highly hydrophobic methacrylate monomers are preferably also present. The higher the amount of hydroxy groups (or the higher the mg KOH/g value), the higher the need will be to introduce highly hydrophobic monomers. To get sufficient surface activity at a hydroxy value of 100 mg KOH/g it is preferred to include an amount of at least 5 wt % of said highly hydrophobic monomers (relative to the segmented copolymer weight).

The segmented copolymer can have a blockcopolymer structure comprising one or more hydrophobic segment blocks and one or more adsorbing segment blocks or a graft copolymer structure having a backbone adsorbing segment with pending grafted hydrophobic segment or having a backbone hydrophobic segment with pending grafted adsorbing segment. Preferably, in the segmented copolymer at least the hydrophobic segment is a macromonomer (also referred to as macromer) made by controlled radical polymerisation of ethylenically unsaturated monomers. The advantage is that such macromonomers have a low molecular weight and a narrow molecular weight distribution, which is preferred for use of the segmented copolymer in making modified nanoparticles. Typically the molecular weight dispersity (Mw/Mn) is less than 2, preferably less than 1.75, more preferably less than 1.5. Typically the number average molecular weight (Mn as determined by GPC) of said macromonomer or segmented copolymer is between 1000 and 10000 gr/mol. Preferably the Mn is between 1500 and 7000 gr/mol, more preferably between 1500 and 5000 and most preferably between 2000 and 5000 gr/mol. It was found that the Mn is preferably chosen sufficiently high to have good surface active and dispersing properties, but is also chosen sufficiently low to assure that most or preferably all of the segmented copolymer can adsorb on the nanoparticles such that little or no free (unbound) segmented copolymer will be present in the film forming composition.

Preferably both the adsorbing segment and the hydrophobic segment are made in subsequent steps by controlled radical polymerisation of ethylenically unsaturated monomers.

Suitable controlled polymer structure polymerization techniques are Group Transfer Polymerization (GTP), Atom Transfer Radical Polymerisation (ATRP), Nitroxyl Mediated Polymerisation (NMP) and reversible addition-fragmentation transfer (RAFT) polymerization. RAFT can be subdivided into S-RAFT, using thio-compounds and C-RAFT using transfer agents with a double bond such as 2,4-diphenyl-4-methyl-1-pentene (or alpha-methyl styrene dimer i.e. AMSD). Catalytic cobalt chain transfer agents and high temperature at high pressure polymerisation processes are also suitable techniques to produce macromonomers and so, segmented copolymers. The latter three techniques are preferred as they are the most suitable techniques on a technical scale. The most preferred controlled polymerisation technique is a reversible addition-fragmentation process using alpha methyl styrene dimer as the transfer agent.

The segmented copolymer further comprises an adsorbing segment comprising functional groups that adsorb on the nanoparticles. The hydrophobic segment preferably comprises essentially no such functional groups. Preferably, the segmented copolymer comprises at most 40 wt. % adsorbing segment, preferably at most 30 wt. % and most preferably at most 25 wt. % (relative to the segmented copolymer weight), the remainder of the segmented copolymer being the hydrophobic segment. The adsorption between the nanoparticles and the segmented copolymer is by non-covalent bonding, preferably by ionic or polar bonds or by complexation or coordination or hydrogen bonding and therefore can easily be formed, even in-situ in the preparation of a film forming composition as will be described in more detail below. The type of functional groups in the adsorbing segment of the segmented copolymer is chosen in view of the type of functional groups on the nanoparticles such that a bond can form. Preferably, the functional groups are acid or basic groups for forming an ionic bond between the nanoparticles and the segmented copolymer by acid-base reaction.

In a preferred embodiment, the segmented copolymer comprise a basic group, preferably an aminogroup, preferably a secondary and even more preferably a tertiary aminogroup, as the functional groups in the adsorbing segment for improving surface migration in a film forming resin of nanoparticles comprising an acidic group, preferably silica particles. Tertiary amines are most preferred because they show little interference with later reactions, like the crosslinking reaction in the curing of the coating. In another embodiment, the segmented copolymer comprises an acid as the functional groups in the adsorbing segment for improving surface migration in a film forming resin of nanoparticles comprising a basic group, preferably alumina nanoparticles. Preferably, the adsorbing segment comprises basic or acidic (meth)acrylate and the hydrophobic segment comprises (meth)acrylate cyclic, branched or linear alkylester. Most preferably, the adsorbing segment comprise an ethylenically unsaturated monomer containing an amino group, preferably a tertiary amino group, most preferably N,N-dimethylaminoethyl methacrylate (MADAM).

It was found important that as much as possible segmented copolymer adsorb on and bind to the nanoparticles to prevent free segmented copolymer in the film forming composition. Therefore the adsorbing segment preferably comprises 2 or more functional groups. On the other hand the amount of hydrophilic functional groups should not be too high. To not deteriorate the surface active properties and to preclude the possibility that one segmented copolymer molecule binds to more than one nanoparticle, the number of functional groups on the adsorbing segment should not be too high and the adsorbing segment is not to long. Preferably the molecular weight (Mn) of the adsorbing segment less than 3000 gr/mol, more preferably less than 2500, even more preferably less than 2000 and most preferably less than 1500, and the number of functional groups is preferably less than 20, more preferably less than 15, most preferably less than 10 functional groups per segmented copolymer. Preferably the adsorbing segment is formed by copolymerising the hydrophobic macromonomers with a monomer mixture comprising and at least 50%, preferably at least 75% (relative to the total weight of monomers in the monomer mixture) of monomers comprising a functional group; for example acrylic acid and methacrylic acid.

Preferably, the segmented copolymer is prepared in a process comprising the steps A: controlled polymerizing, optionally using a radical polymerization initiator, at least one ethylenically unsaturated monomer in the presence of a metal complex as a catalytic chain transfer agent, or an addition cleavage-type chain transfer agent, or at high temperature conditions to form the surface active hydrophobic segment macromonomer and (B) copolymerizing said macromonomer in a monomeric mixture comprising at least one copolymerisable unsaturated monomer containing the functional groups forming the adsorbing segment. Optionally, the segmented copolymer can also be made by post-modification of a macromonomer hydrophobic segment. Preferably, the controlled polymerization process is a reversible addition-fragmentation process using alpha methyl styrene dimer with methacrylate monomers to form a macromonomer hydrophobic segment and then copolymerising the macromonomer with basic or acidic methacrylate monomer to form the adsorbing segment.

The described segmented copolymers are used to prepare modified nanoparticles that, when used in film forming composition, enrich at the surface of the coating or film. The invention hence also relates to modified nanoparticles comprising nanoparticles having adsorbed thereon a segmented copolymer according to according to the invention. The nanoparticles have an average particle size between 1 and 500 nm and have at the surface groups, preferably acid or basic groups, which can bind to the functional groups of the segmented copolymer. As described below in more detail in the most preferred embodiment, the nanoparticles are colloidal silica nanoparticles and the segmented copolymer comprises one or more basic functional groups in the adsorbing segment.

The amount of segmented copolymer is preferably chosen not too high to prevent that free unbound segmented copolymer ends up in the film forming composition. Preferably, the amount of segmented copolymer on the nanoparticles is at most 100 wt. %, preferably 10 to 80 wt. % preferably 10 to 70 wt. % preferably 10 to 60 wt. % and most preferably 10 to 50 wt. % (relative to the total solid weight of the nanoparticles).

Preferred nanoparticles for modification with blockcopolymers are nanoparticles that can be well dispersed in organic media and are preferably not surface active and are fully compatible with resin formulation and coatings. Such colloidal dispersion of nanoparticles preferably are essentially clear and essentially free of agglomerates. Nanoparticles based on amorphous silica are preferred as they are commercially well available or easy to make via known solvent conversion routes from aqueous colloidal silica. Clear dispersions of amorphous nanosilica that are not surface active are suitable because they comprise acidic silanol groups at the surface. The acidic silanol groups permit the adsorption of basic blockcopolymers and so the introduction of surface activity.

The modified nanoparticles can be made prepared in various different ways, for example in a separate modified nanoparticles preparation by contacting the segmented copolymer with the nanoparticles step or in-situ in a film forming composition preparation process by mixing the segmented copolymer and nanoparticles together with other film forming composition components. A preferred process for the preparation of the modified nanoparticles comprises the steps of adding the segmented copolymer to a (preferably clear-to-opalescent) colloidal dispersion of, preferably amorphous, nanosilica in an organic solvent as will be described in more detail hereafter. Amorphous nanosilica is preferred because it has more reactive silanol groups at the surface of the particle for bonding with the segmented copolymer.

The invention further relates to a film forming composition, in particular coating compositions comprising a resin and modified nanoparticles according to the invention wherein the surface active hydrophobic segment of the segmented copolymer is more hydrophobic than the resin of the film forming composition. Film forming composition are used to make coatings or films. Coatings are always formed on a substrate and stay on a substrate, whereas films are not necessarily formed on a substrate and are necessarily stay on a substrate. Preferably, the film forming composition is a coating composition, preferably a water or solvent borne dispersion comprising a cross-linkable resin and optional also a cross-linking agent. The film forming composition can also be a thermoplastic polymer composition for making films. The resin is also referred to as binder or binder resin. The film forming composition can be produced in different ways, for example by mixing resin with separately prepared modified nanoparticles, by mixing nanoparticles with a separately prepared mixture of resin and segmented copolymer, by mixing segmented copolymer with a separately prepared mixture of resin and nanoparticles or by direct mixing of resin, nanoparticles and segmented copolymer.

Segmented copolymers such as blockcopolymers (AB, ABC etc.) and graftcopolymers (A-g-B) can be formed by controlled polymer structure polymerization techniques. The range of such techniques are Group Transfer Polymerization (GTP) i.e. a pseudo-anionic technique using methacrylate monomers (see O. W. Webster in Encyclopedia of Polymer Science and Engineering, Vol 7, H. F. Marks, N. M. Bikales, C. G. Overberger, G Menges, eds., Wiley Interscience, New York 1987, p. 580-588). Atom Transfer Radical Polymerisation (ATRP) is a controlled radical polymerization technique that uses a halide atom as mediator and a copper catalyst, (see K. Matyjaszewski, J. Xia, Chem. Rev. 2001, 101, p 2910-2990). Acrylic, methacrylic and styrene monomers can be copolymerized with ATRP. Nitroxyl Mediated Polymerisation (NMP) uses the same monomers as ATRP. Here, the mediator is a nitroxyl radical which has to be removed from the end of the polymer chain after polymerisation, for example by raising the reaction temperature, (see C. J. Hawker, A. W. Bosman, E. Hart, Chem. Rev. 2001, 101, 3661-3688). Reversible addition-fragmentation transfer (RAFT) polymerization is another controlled radical polymerization technique. RAFT can be subdivided into S-RAFT, using thio compounds and C-RAFT using transfer agents with a double bond such as 2,4-diphenyl-4-methyl-1-pentene (or alpha-methylstyrene dimer i.e. AMSD). See G. Moad et all in Polym. Int. 2000, 49, 993-1001 and S. Perrier, P. Takolpuckdee, J. Polym. Sci. Part A: Polym Chem. 2005, 43, 5347-5393). Catalytic cobalt chain transfer agents and high temperature at high pressure polymerisation processes are besides C-RAFT techniques resulting in macromonomers with vinyl end groups and so, segmented copolymers. The latter three techniques are preferred as they are the most suitable techniques on a technical scale. In EP 1295922 the synthesis of macromonomers using catalytic cobalt chain transfer agents or AMSD and the successive preparation of segmented copolymers is described in more detail. Further reference is made to the high temperature process described WO2006/024669, which can be used for preparing macromonomers and subsequently of the segmented copolymers. The AMSD route is the most preferred route as no high temperature is required and no removal of toxic cobalt compounds is necessary. With the AMSD as C-RAFT controlled polymerization technique segmented copolymers are relatively easily to get by first making a macromonomer and then either a block or a graft polymer depending on the copolymerisation conditions. For example, feeding in the reactor a macromonomer (made from AMSD and a set A of methacrylate monomers), a set B of methacrylate monomers comprising functional groups and a radical initiator will yield an AB blockcopolymer segmented copolymer.

AB blockcopolymers appear to perform well as segmented copolymer according to the invention. They preferably comprise a surface active block A being originally the macromonomer, and a block B containing one or more, preferably at least on average 2, basic or acidic or other groups that can bind to the nanoparticles and possessing a number average molecular weight between 10000 and 5000, preferably between 1000 and 7000, more preferably between 1500 and 6000 and most preferably between 2000 and 4000. The choice of the molecular weight of the segmented copolymer depends on the type of resin of the envisaged coating composition. Too high molecular weight may result in insufficient compatibility with the coating resin and resulting poor coating properties. Too low molecular weight of the macromonomer may result in insufficient stabilisation of the nanoparticles and low surface migration improvement. When using nanosilica the presence of basic amino-groups in block B of the AB blockcopolymers is very suitable to realize the adsorption on the acidic silanol groups present at the surface of the silica. Preferably secondary or more preferably tertiary amino-groups are used because they do not interfere with the curing reaction. Incorporation of amino-groups can be realized with amino-containing ethylenically unsaturated monomers preferably having the general formula C(H2)C(XH)C(O)OR—NR1R2 wherein R,R1R2 are independent hydrocarbon groups, preferably having 1 to 4 carbon atoms (denoted as "C1 to C4") and X=H or CH3; Most preferably these monomers are N,N-dimethylaminoethylmethacrylate, N,N-diethylaminoethylmethacrylate, N,N-dimethylaminopropylmethacrylate, N-t-butylaminoethylmethacrylate and N,N-dimethylaminobutylmethacrylate.

The hydrophobic segment in the segmented copolymer (block A in the block-copolymer) affords the surface activity and preferably is composed of AMSD, and C1 to C24 linear, branched or cyclic alkylester of methacrylic acid such as butylmethacrylate, 2-ethylhexylmethacrylate, laurylmethacylate and of hydroxyalkylmethacrylate such as hydroxyethylmethacrylate, hydroxypropylmethacrylate.

Hydroxy containing monomers can be included in the blockcopolymer to provide groups being reactive with the film forming composition. To compensate for the presence of such hydrophilic hydroxy monomer to get sufficient hydrophobicity and surface activity in block A higher hydrophobic monomers like laurylmethacrylate and 2-ethylhexylmethacrylate can be included instead of lower hydrophobic monomer such as butylmethacrylate.

In the modified particles the particles preferably are nanoparticles having an average diameter between 1 and 400 nanometers. By an average diameter is meant: for a sphere shaped particle the diameter, for a plate shaped particle the thickness and for a needle shaped particle the cross-sectional diameter should be lower than 400 nm, being the lowest wavelength of the visible light. Nanoparticles are invisible in visible light and therefore can be used in a clear coating. Further, nanoparticles more easily migrate to the surface of the coating where they are more effective for providing scratch resistance. In view of that, it is more preferred that the particles have an average diameter between 1 and 150 nanometers. Nanoparticles may form clusters. To prevent that such nanoparticles clusters become visible and cause haziness in the clear coating, it is most preferred that the nanoparticles have an average diameter between 1 and 50 nanometers.

The type of nanoparticles is chosen in view of their intended application. The segmented copolymer according to the invention bring the particles to the surface where more effective. A smaller amount of nanoparticles is needed for the same effect level without risk of haziness in a clear top coating. The particles may possess properties or contain compounds to protect the polymer matrix against weathering, abrasion, UV radiation, oxidation, dirt, and graffiti or may contain compounds that need to be accessible from the outside, for example pigments or marking compounds like laser marking compounds. The type of particles may be chosen in view of imparting certain barrier properties to films or coatings. The particles may contain compounds with high refractive indices to increase reflection, or low reflection to reduce reflection. The particles may be organic or inorganic. To improve scratch resistance, the particles preferably are inorganic nanoparticles, preferably chosen from the group of silica, alumina, zirconia, titania, an inorganic oxide core of one type on which is deposited an inorganic oxide of another type, hybrids and/or mixtures thereof, glass, mineral or synthetic clay, zeolite and organic particles having hydroxyl groups on the surface of the particle. The inorganic nanoparticles suitable for coating compositions of the present invention preferably are essentially colourless to not seriously interfere with the light transmissive characteristics of the coating compositions when unpigmented. The particles must have at the surface thereof groups that can bind with segmented copolymer, such that the adsorbed segmented copolymer stays on the nanoparticles in the film forming composition. The bonding between the nanoparticles and the adsorbed segmented copolymer is non-covalent, preferably by ionic, polar, complexation, coordination or hydrogen bond.

In view of obtaining a high scratch resistance and car wash resistance at a high clarity of the coating, the particles in the modified particles preferably are silica particles. A particularly preferred class of inorganic nanoparticles for compositions of the present invention are colloidal solutions of amorphous silica in preferably aprotic organic solvents (hereinafter an organosol). Organosols of silicas have an average particle diameter ranging from about 1 to about 150 nanometers (nm), preferably from about 1 to about 100 nm, and most preferably from about 3.5 to about 50 nm.

Organosols are also commercially available. Nissan Chemical is for instance a well known supplier of different types organosilicasols. For instance Nissan's Organosilicasol™ MIBK-ST is a type in methyl,isobutylketone and PMA-ST a type in Dowanol PMA. Also Clariant sells similar organosols (Highlink NanOG). If it is not available that it can be prepared by replacing in a protic organosol, for example an ethoxylated particle dispersion in ethanol, the protic solvent with an aprotic solvent-, for example by distillation.

Techniques for preparing such dispersions of colloidal silica in alcohols are known, see e.g. PCT/EP2006/061826. Such colloidal dispersions can be prepared by controlled addition of an aqueous silica sol to the alcohol and preferably simultaneously removing water for example by an azeotropic distillation at a temperature at least sufficiently high to effect to some extent a chemical reaction between the hydroxyl groups of the alcohol and hydroxyl groups on the particles, preferably, in case the particles are silica, of the silanol groups (Si—OH) of the colloidal silica. The products are sometimes referred to as alcosols and contain (silica) particles having chemically modified surfaces. Another method to partially esterify with monoalcohol is to use dialkoxy ketals such as dimethoxypropane to convert nanosilica aquasol into an organosol comprising alcohol and ketones as liquid carrier.

Preferred aprotic solvents are ketones (e.g. 2-heptanone), propyleneglycol methylether acetate (=Dowanol PMA), xylene, all boiling at higher temperature than the applied reactant. In view of the boiling point requirement, preferably an alcohol is used containing at most 4 carbon atoms. The aprotic solvent is chosen in view of providing a good compatibility and hence good colloidal stability of the esterified nanosilica, and furthermore in view of permitting in the second step a further derivatisation with the hydrophobic surface active blockcopolymer without loss of the colloidal stability. In this context 2-heptanone appeared to be very suitable aprotic solvent. It should be remarked that suitable organosols before the adsorption step do not show any surface activity and possess so no tendency to migrate to the surface of coatings but when applied in the coating are homogeneously distributed.

The amorphous silica sols in an aqueous medium (also referred to as hydrosols, aquasols or colloïdal silica) may be prepared for example by partially neutralizing an aqueous solution of an alkali metal silicate, usually sodium silicate, with acid to a pH typically of about 8 to about 9 such that the resulting sodium content of the solution usually is less than about 1 percent by weight based on sodium oxide. A somewhat different, less common approach involves reacting the aqueous sodium silicate solution with sufficient acid to make an acidic sol and precipitating the sodium salt in a strongly acidic medium. This alternative approach makes use of the property that polysilic acid is temporarily stable at about a pH of 2, and if the sodium salt of the acid used for neutralizing the sodium silicate is sufficiently insoluble, it can be precipitated and separated. Once the salt is separated from the acidic sol, the sol can be alkalinized to grow colloidal particles and stabilize the product or can be employed in other known processes of growing silica particles to the desired size.

Suitable aqueous colloidal dispersions or aquasols are marketed for instance by Akzo Nobel under the trade names Bindzil and Nyacol. The Nyacol 2034 DI is an opalescent aquasol of nanosilica with a solid content of 34% and a pH of 2.5. Specific surface area is 180 to 200 m2/g; particle range is 10 to 20 nm with a mean diameter of 16 nm. As on silica 4.6 Silanol groups per nm2 are expected, one calculates that about 1.45 mmols of silanol groups/per g of solid nanosilica is present at the surface. Also Nissan Chemical sells aqueous colloidal silica, with the tradename Snowtex. Type O has a particle range of 11-14 nm and is also well suitable for the preparation of organosols.

Silica sols having uniform spherical silica particles of controlled particle size can also be prepared by hydrolyzing a lower alkoxysilane like tetraalkyl-orthosilicate in an alcohol medium containing suitable amounts of water and ammonia. This method has been described by Stober et al in the JOURNAL OF COLLOID AND INTERFACE SCIENCE, Volume 26, pages 62-69 (1968) the disclosure of which is hereby incorporated by reference.

The segmented copolymers, especially the AB blockcopolymers that are preferentially made by means of the AMSD route, can be applied for adsorption onto the nano particles under solvent-borne conditions in several ways. A first general route is to mix the blockcopolymers and the nanoparticles in the absence of any further binder or cross-linker. A second general route is to add the segmented copolymer to the nanoparticles that are already dispersed in the solvent-borne binder solution optionally in the presence of the cross-linker. A third general route is to add the segmented copolymer to the solvent-borne binder solution optionally in the presence of the cross-linker and later mix in the NP. The coating of film forming composition can also be prepared by mixing all components in one manufacturing step. This illustrates that an important advantage of the segmented copolymer of the invention is that nanoparticles in a film forming composition can be formed in many different ways allowing more process flexibility than prior art processes. The first general route includes also the possibility to introduce the blockcopolymers to the nanoparticles dispersed in a protic organic solvent and to exchange then thereafter the protic solvent for a higher boiling aprotic solvent by evaporation. Alcohols such as ethanol and butanol are for instance easily to replace by 2-heptanone.

Depending on the average size of the particles in the organosols, the preferred amounts of segmented copolymers may vary. The lower the mean particle size, the higher the required relative amount of will be because the average specific surface (area in m2 per g solid material) increases with a lower particle size. For nanoparticles having an average diameter in the range in the 10 to 50 nm, 50 to 1000 mg, per gr nanoparticles, preferably 100 to 500 mg, most preferably 100 to 350 mg solid segmented copolymer with an average Mn of 2000 to 6000, preferably 2000 to 5000 gr/mol is added for adsorption to achieve sufficient enrichment of the particles at the surface in a clear coating without loss of the clarity of the coating. For nanosilica having an acidic surface, the average amount of tertiary amine groups on the blockcopolymer is to be in the range of 0.5 to 2.0 mmoles/g solid blockcopolymer preferably 0.5 up to 1.5 mmoles/g and most preferably 0.8 up 1.5 mmoles/g. Too many amino groups leads to thixotropic solution of blockcopolymer adsorbed on nanosilica, while too less leads to hazy coatings when used in a clear coating.

The invention further relates to modified nanoparticles obtainable by the above described method, to colloidal dispersion of such modified particles, in particular to a modified colloidal silica particle dispersion. It is a particular advantage of a colloidal dispersion of modified nanoparticles that it can be easily converted to a coating composition without risk of agglomeration of the particles. For example, in a preferred embodiment, a colloidal dispersion of coated particles is blended, preferably "cold-blended" with a solution of a cross-linkable binder to a long term stable colloidal dispersion with a clear to opalescent appearance. This dispersion can at due time be further formulated with cross-linking agent, further solvent and additives to form a coating composition.

The invention also relates to the use of the particles modified with the segmented copolymer according to the invention in a polymer composition and, in particular, relates to a polymer composition comprising a polymer material and modified particles according to the invention. The polymer material can be a thermoplastic polymer (i.e. a not cross-linkable polymer) but preferably is a crosslinkable polymer in view of the film forming properties. The invention more in particular relates to a coating composition comprising a polymer binder system, a cross-linking agent and modified particles according to the invention.

The polymer binder system preferably is a solvent borne coating composition, but can also be an aqueous emulsion or dispersion of a polymer binder material, optionally with a cross-linking agent, or powder coating composition. In particular, the invention relates to a clear coating composition comprising essentially no pigments for making a clear top coating finish or refinish. Essentially no pigments implies less than 10, preferably less than 5, more preferably less than 2 and most preferably less than 1 wt. % of pigments (relative to total solids in the coating composition).

Good results can be obtained if the coating composition according to the invention comprises between 0.1 and 20 wt % of the modified nanoparticles (relative to the total weight of solids in the coating). Preferably, the coating composition comprises between 0.1 and 15 wt. %, more preferably between 0.1 and 10 wt. %, even more preferably between 0.1 and 7 wt. % and most preferably between 0.1 and 5 wt. % coated particles according to the invention. Good results can even be obtained at very low amounts below 3 wt. % or even below 2 wt %.

The film forming binder system preferably contains a cross-linkable resin and a cross-linker. The cross-linkable resin may be any cross-linkable resin suitable for use in an essentially solvent-based, organic coating composition. Often such cross-linkable resins are referred to as "thermosetting resins". As used herein, the term "cross-linkable resin" is intended to include not only resins capable of being cross-linked upon application of heat but also those resins which are capable of being cross-linked without the application of heat. Examples of such cross-linkable resins include the generally known thermosetting acrylics and polyesters containing one or more functional groups selected from hydroxyl groups, carbamate groups, epoxy groups, carboxylic groups, anhydride groups and mixtures of any of the foregoing.

Acrylic resins refer to the generally known addition polymers and copolymers of acrylic and methacrylic acids and their ester derivatives, acrylamide and methacrylamide, and acrylonitrile and methacrylonitrile.

Polyester resins are generally known and are prepared by conventional techniques utilizing polyhydric alcohols and polycarboxylic acids. Moreover, polyesters are intended to include polyesters modified with fatty acids or glyceride oils of fatty acids (i.e. conventional alkyd resins).

Nonlimiting examples of suitable cross-linkable resins are any polyhydroxy group-containing polymer conventionally used in amino resin (i.e. 1K formulations) and/or polyisocyanates cross-linkable coating (2K) compositions.

Particularly suitable polymer materials include polyols, hydroxy-functional acrylic resins containing pendant or terminal hydroxy functionalities, hydroxy-functional polyester resins containing pendant or terminal hydroxy functionalities, hydroxy-functional polyurethanes, polyurethane-modified polyester polyols, polyurethane-modified polyacrylate polyols, and mixtures thereof. The polyhydroxy group-containing polymer contains on average at least two, and preferably more than two, hydroxy groups per molecule. Preferred polyhydroxy group-containing polymers are those with an acrylic or polyester backbone.

The polyhydroxy group-containing polymers preferably have weight average molecular weights of at least 1,000 to about 2,000,000. Usually, the weight average molecular weight is between 2,000 and 1,000,000, more preferably between 2,000 and 800,000, and most preferably between 2,500 and 100,000. The weight average molecular weight depends on the application requirements, and methods to modify the molecular weight accordingly are known to the skilled man.

Preferably, the coating composition comprises a polymer having a hydroxy number of 20 to 300 mg KOH/g polymer and more preferably of 60 to 200 mg KOH/g polymer. Such polyhydroxy-containing polymers are commercially available.

The coating composition may also comprise an epoxy-functional binder and a polyacid cross-linker reactive with the epoxy groups. Epoxy resins are generally known and refer to compounds or mixtures of compounds containing more than one 1,2-epoxy group. The polyepoxides may be saturated or unsaturated, aliphatic, cycloaliphatic, aromatic or heterocyclic.

The coating composition may also comprise a carbamate functional binder and a melamine cross-linker reactive with the carbamate groups. Carbamate functional groups can be incorporated into the polymer binder material by copolymerizing, ethylenically unsaturated monomers with a carbamate functional vinyl monomer such as a carbamate functional alkyl ester of methacrylic acid. Carbamate resins and their manufacture are generally known and refer to compounds or mixtures of compounds containing more than one carbamate group. U.S. Pat. No. 3,479,328 is incorporated herein by reference. Also, hydroxyl functional acrylic polymers can be reacted with Isocyanic acid to provide pendent carbamate groups. Likewise, hydroxyl functional acrylic polymers can be reacted with urea to provide pendent carbamate groups.

Generally known cross-linking agents can be incorporated in a composition of the invention, particularly in case the cross-linkable resin comprises a thermosetting resin containing active hydrogen functionality. As will be appreciated by one skilled in the art, the choice of cross-linking agent depends on various factors such as compatibility with the film-forming resin, the particular type of functional groups on the film-forming resin and the like. Representative examples of cross-linking agents include blocked and/or unblocked diisocyanates, poly-isocyanates, diepoxides, aminoplasts, trisalkoxycabonyltriazines carbamates, cyclic carbonate groups, and anhydride groups. Examples of such compounds for 1K (i.e. 1 pack) formulations with hydroxy containing binders include melamine formaldehyde resin (including monomeric or polymeric melamine resin and partially or fully alkylated melamine resin)

The aminoplast contains imino and methylol groups and in certain instances at least a portion of the methylol groups are etherified with an alcohol to modify the cure response. Any monohydric alcohol can be employed for this purpose including methanol, ethanol, n-butyl alcohol, isobutanol, and hexanol. For instance Setamine® US138 BB-70 is a butylated formaldehyde/melamine resin ex Nuplex Resins. Further useful cross-linking agents are polymeric melamine is which are at least partly etherified with methanol and mixed ethers with methanol or ethanol or with (iso)butanol. For 2K (i.e. 2 pack) formulations polyisocyanates are usually applied. E.g. Tolonate HDT LV (ex Rhodia) is a commercially available polyisocyanate.

In the coating composition, the most preferred polymer binder is a hydroxyl functional acrylic polymer in combination with a cross-linking agent, preferably and isocyanate, aminoplast or melamine.

Optionally the coating compositions can comprise other additives like catalysts, sag control agents, UV-absorbers, flow enhancers, film formation improvers, such as wetting and levelling agents, etc. In a preferred embodiment, the coating composition according to invention further comprises a sag control agent, preferably reaction products of (poly)isocyanates and monoamines as disclosed in e.g. NL7613121 and EP192304. In a preferred embodiment of the invention it is found that when the coated particles according to the invention are combined with sag control agents, preferably the reaction products of (poly)isocyanates and monoamines, the stability (shelf life) of the resulting coating composition increases, probably due to the reduced mobility of the particles under very low shear conditions. Although, it might be expected that, when mixing coated particles according to the invention with sag control agents, a reduction of functionality and/or efficiency occurs for the coated particles and maybe also for the sag control agent, it was found that the coated particles according to the invention are advantageous because they are not severely hindered by sag control agents, in particular the above-mentioned reaction products of (poly) isocyanates and monoamines.

The coating compositions may include a suitable known catalyst or a blocked catalyst to enhance the cure reaction. The catalyst is present in an amount sufficient to accelerate the reaction. The catalyst can be present, when added to the other components which form the coating composition, in an amount ranging from 0.1 to 5.0 percent by weight, and is typically present in an amount ranging from 0.5 to 1.5 percent by weight based on the total weight of the resin solids of the components which form the coating composition.

In another embodiment, additional components can be present during the formation of the coating compositions as previously described. These additional components include, but are not limited to, flexibilizers, plasticizers, levelling aids (such as, for example polyacrylates marketed by Byk Chemie under e.g. the tradename Byk 358), thixotropic agents, anti-gassing agents, organic co-solvents, flow controllers, hindered amine light stabilizers, anti-oxidants, UV light absorbers, coloring agents or tints, and similar additives conventional in the art, as well as mixtures of any of the foregoing can be included in the coating composition. These additional ingredients can present, when added to the other components which form the coating composition, in an amount up to 40 percent by weight based on the total weight of the resin solids of the components which form the coating composition.

The coating composition of the invention may comprise an organic solvent as it is desirable that the composition is in a sufficiently low viscous liquid state enabling e.g. easy spraying. Examples of useful organic solvents include methyl ethyl ketone, methyl isobutyl ketone, 2-heptanone, n-amyl acetate, ethylene glycol butyl ether acetate, propylene glycol monomethyl ether acetate, xylene, n-butylacetate, n-butanol, or blends of aromatic hydrocarbons like Solvesso 100. The solvent may be present in an amount of preferably less than 60 weight percent, and more preferably of at most about 50 weight percent.

The coating compositions of the present invention can be solvent-based coating compositions, water-based coating compositions (such as water borne secondary emulsions), or in solid particulate form, a powder coating composition, or in the form of a powder slurry or aqueous dispersion. The components of the present invention used to form the cured compositions of the present invention can be dissolved or dispersed in an organic solvent. Suitable powder clearcoats are described in U.S. Pat. No. 5,663,240, which is incorporated herein by reference, and include epoxy functional acrylic copolymers and polycarboxylic acid curing agents. Further coating compositions of the invention can be non solvent-based but in the liquid form coating composition such as UV curable acrylated resins or monomers and peroxide curable unsaturated (maleic anhydride) based polyesters/styrene blends.

Said coating compositions according to the invention after curing yield clear films with high film hardness, good polishability, good resistance to water and organic solvents, good durability, and good acid etch resistance. A major advantage of the coated particles according to the invention in the cured clear films is that the dry and/or the wet scratch resistance are significantly improved with low amounts of coated particles, even as low as below 5 wt. %; even sometimes with only a very small amount of coated particles of below 2 wt. %. The enrichment of the nanoparticles at the surface appears to play an important role on the scratch resistance.

The curable coating compositions according to the present invention have utility in coatings, such as automotive coatings, general industrial coatings, baked enamels, and wood finishes. They are also usable as moulding and adhesive compositions and for coating optical data storage devices. Especially the invention relates to the use of said coating composition as a pigment-free top coat or a clear coat in the finishing and refinishing of articles, for example knobs, handle, switches and the like, motorcycles, exteriors and interiors of cars, trains, buses, trucks, and aeroplanes. Also in solid topcoats including pigments the curable compositions are applicable.

The composition of the invention is applicable as a clear and/or colourless coating composition over a pigmented base coat as part of a composite colour-plus-clear coating. Such composite coatings are popular for their depth of colour and liquid glossy surface appearance. They have found particularly wide acceptance in the field of automotive coatings.

The coating compositions of the present invention can be coated on the article by any of a number of techniques well-known in the art. These include, for example, spray coating, dip coating, roll coating, curtain coating, and the like. For automotive body panels, spray coating is preferred. After contacting the substrate and the coating composition, the solvent is allowed to partially evaporate to produce a uniform coating on the substrate. Subsequently, the compositions can be subjected to conditions to cure the coating layers.

Various methods of curing may be used depending on the type of cross-linking chemistry and type of application. For instance, for automotive heat curing is effected by exposing the coated article to elevated temperatures provided primarily by radiative heat sources. Curing temperatures will vary depending on the aminoplast or polyisocyanate and functional polymer used; however, they generally range between 70° C. and 190° C. and are preferably between 110° C. and 160° C., most preferably between 125° C. and 150° C. The curing time will vary depending on the particular components used and physical parameters such as the thickness of the layers; however, typical curing times range from 15 to 60 minutes. For car refinishes where polyisocyanate as cross-linker is mostly applied, forced drying conditions e.g. at 60° C. for 20 up to 60 minutes and a 7 day period at ambient temperatures are normal curing conditions.

The cured coatings preferably have a particle enrichment factor of at least 1.5, more preferably at least 2, even more preferably at least 5 and most preferably at least 10. The particle enrichment factor is measured using TOF-SIMS as described in Example 1B. The cured coating comprising the modified nanoparticles according to the invention preferably has initial gloss of at least 85 GU and a haze of at most 40 HU and an improvement in scratch resistance (according to the Crock test herein described) of at least 10% preferably at least 20% more preferably at least 30% and most preferably at least 50% (compared to the same coating not having the modified nanoparticles). Most preferably, the cured coating comprising the modified nanoparticles according to the invention preferably has a gloss retention after scratch resistance test (according to the Crock test herein described) of 60%, preferably at least 70%, more preferably at least 80%. With the modified particles according to the invention most preferred cured coatings can be provided having initial gloss of at least 85 GU and a haze of at most 20 HU and a gloss retention after scratch resistance test (according to the Crock test herein described) of more than 70%.

DESCRIPTION OF ILLUSTRATIVE EMBODIMENTS

The present invention is illustrated by means of the following non-limiting examples.

Coating compositions were applied by spraying onto electro-coated steel panels or Q-panels coated with a commercial primer and a commercial dark blue base coat. The base coat was applied in two layers with a 1 minute flash-off between the layers. The coating composition was applied after 5 minutes flash-off, also in two layers. After 10 minutes flash-off the complete system was baked for 30 minutes at 140° C.

Gloss was measured in a conventional way using a Dr. Lange glossmeter LMG 070 or a Byk Haze-Gloss 4601 glossmeter (reference is made to ISO 2813). Gloss is expressed in Gloss units (GU) and haze in Haze units (HU). The required level for the gloss of a clear coat depends amongst other parameters (such as orange peel and unevenness) on the type of binder cross-linker system. For most practical purposes 2K systems based on isocyanates as cross-linkers should have a 20° gloss of 85 GU or higher, whereas 1K systems based on melamine cross-linkers normally have a 20° gloss of 90 GU or higher. The haze of a clear coat should be as low as possible. The haze should be less than 40 HU, more preferably less than 20 and most preferably less than 15 HU.

The car wash resistance was determined with the aid of a mini-car wash device according to Renault specification RNUR 2204—C.R. PO N° 2204. In this test the coated panel is subjected for 10 minutes to a rotating washing brush similar to the ones used in a commercial car wash. During this operation a slurry of aluminium oxide paste Durmax 24H from Prolabo Paris is continuously sprayed over the panel. The loss of gloss is taken as a measure of the car wash resistance. The Observed Loss of Gloss is defined as follows: Observed Loss of Gloss=(Initial gloss−Final gloss)/Initial gloss*100%. The Initial gloss is defined as the gloss of the cured coating before the car wash test. The Final gloss is defined as the gloss of the cured coating after the car wash test. Gloss was measured in accordance with ISO 2813 using a Haze Gloss apparatus from Byk Gardner GmbH. The time elapsed between the car wash test and the loss of gloss measurement was about 1-3 hours. All samples were stored at room temperature between the car wash test and the gloss measurement.

The mar or scratch resistance under dry conditions was also tested using the crockmeter. A 50 mm×50 mm square of 3M polishing paper (grade 281Q, 9 micron) was placed over a similar size of felt with the abrasive side of the polishing paper facing outward. The two squares are mounted over the finger of the mar tester. A ring clamp was used to secure the two squares on the finger. The 20° gloss of the test surfaces was measured before the test and then the test surfaces were subjected to ten double rubs. After the test the 20° gloss of the abraded area was measured in a direction parallel to the rubbing stroke of the mar tester. The mar resistance is expressed as percentage gloss retention.

Colloidal Dispersions of Monoalcohol Esterified Nanosilica

Preparation A. Butyl-nanosilica in 2-heptanone 100 g of Nyacol 2034 DI was brought together with 300 g of ethanol and 200 g of n-butanol. From the mixture water was azeotropically removed by distillation under reduced pressure at 30° C. until a mass of 150 g of the colloidal dispersion was reached. 150 g heptanone was then added and the mass was again concentrated to 150 g. Once more the same operation was performed to get a clear to opalescent colloidal dispersion of butyl-silica in 2-heptanone with a solid content (after 1 hour at 140° C.) of 22.7%. With elemental analysis the carbon content of the dried butyl-silica was determined to be 1.5% indicating that the silanol groups were partially converted into butoxy-silicium groups.

Preparation B. Butyl-nanosilica in 2-heptanone 250 g of a mixture of 60 parts ethanol and 40 parts of 1-butanol is brought in a flask and heated to 80° C. 125 g Nyacol 2034 DI is then mixed with 375 g of the 60/40 mixture of ethanol/1-butanol mixture and this is then dropwise added to the alcohol mixture in the flask keeping the volume in the reactor constant. This is done by simultaneous removing at normal pressure the azeotrope by distillation. After the complete addition of the Nyacol solution 300 g of heptanone is gradually added under simultaneous removal, firstly at normal temperature and then at reduced pressure, of the lower boiling azeotrope and later MAK until a 170 g clear dispersion of butyl-silica in MAK is obtained with a solid content (after 1 hour at 140° C.) of 27%.

Preparation C Butyl-nanosilica in 2-heptanone (Setalux X11682 PP10 ex BoZ)

Butylsilica in 2-heptanone was made starting from Nissan Chemicals aquasol Snowtex —O and following the procedure described for preparation B.

Preparation of the Segmented Copolymer

As the segmented copolymer, an AB blockcopolymer was prepared by first synthesising a macromonomer block and subsequently forming the adsorbing segment block thereon The Preparation of the Macromonomer:

A reaction vessel for producing acrylic resin, which was equipped with a stirrer, thermometer and a reflux condensing tube was charged with a homogenous mixture of 60.5 g alpha-methyl-styrenedimer (AMSD), 24.27 g of butylmethacrylate (BuMA), 21.27 g of 2-hydroxypropylmethacrylate (HPMA), 24.26 g 2-ethylhexylmethacylate (EHMA). The vessel was heated under stirring and brought at 145° C. while nitrogen-substituting the inside atmosphere of the reaction vessel. Under maintaining the temperature at 145° C. over a period of 5 hours, a mixture was dosed of 218.1 g of butylmethacrylate, 190.6 g 2-hydroxypropylmethacrylate, 218.06 g of ethylhexylmethacrylate and 11.4 g Perkadox AMBN (i.e. 2,2-Azodi(2-methyl-butyronitrile). Thereafter in 30 minutes 1.14 g Perkadox AMBN dissolved in 30.74 g 2-heptanone is added. The macromonomer is then cooled down to room temperature. M-20. With GPC and polystyrene as standards Mn, Mw and Pd were determined. In Table 1 the GPC results for M-20 are included. Additionally, with NMR the percentage incorporated AMSD is determined. This was at least 92% for all macromonomers.

TABLE 1

MACROMONOMER COMPOSITION AND PROPERTIES

Macromonomer code — Parts of constituting monomers

| Macromonomer code | AMSD | BUMA | EHMA | HPMA | Mw | Mn | D |
|---|---|---|---|---|---|---|---|
| M-35 | 8 | 100 | 0 | 0 | 3540 | 2360 | 1.5 |
| M-51 | 8 | 69.6 | — | 30.4 | 5870 | 2960 | 2.0 |
| M-19 | 8 | 52.2 | 17.4 | 30.4 | 3820 | 2310 | 1.7 |
| M-20 | 8 | 34.8 | 34.8 | 30.4 | 4074 | 2533 | 1.6 |
| M-21 | 8 | 17.4 | 52.2 | 30.4 | 4206 | 2525 | 1.6 |
| M-22 | 8 | 0 | 69.6 | 30.4 | 3900 | 2580 | 1.5 |

| Macromonomer code | AMSD | BUMA | LMA | HPMA | Mw | Mn | D |
|---|---|---|---|---|---|---|---|
| M-542 | 8 | 34.8 | 34.8 | 30.4 | 4867 | 2714 | 1.8 |

LMA = laurylmethacrylate

The Synthesis of an AB Blockcopolymer

In the same equipment as described above for the synthesis of the macromonomer, 289.41 g macromonomer M-20 is brought. The vessel was heated under stirring and heated to 145° C. while nitrogen-substituting the inside atmosphere of the reaction vessel. Under maintaining the temperature at 145° C. over a period of 5 hours a mixture was dosed of 3.63 g Perkadox AMBN and 72.41 g of 2-(dimethylamino)ethylmethacrylate (MADAM). Thereafter, 0.36 g Perkadox in 9.65 g 2-heptanone in 30 minutes was added and after 1 hour at 145° C. The material was cooled down and 344.6 g 2-heptanone was added in order to obtain a 50% solution of blockcopolymer M-20/MAD-20. The average number of functional groups per segmented copolymer is 6. All AMSD was converted in this polymerisation condition. Measurement with GPC, however, gave false data because of the adsorption of the MADAM basic groups on the size exclusion column. From experience it is known that adding of 20 parts of monomer like butylmethacrylate to 80 parts macromonomers increase the Mn with 25%. Table 2 lists the composition of the AB blockcopolymers made according the typical procedure (parts means wt % relative to the total segmented copolymer weight).

TABLE 2

AB BLOCK COPOLYMER COMPOSITION AND PROPERTIES

| Code block copolymer | Type of macromonomer applied | Parts of macromonomer applied | Parts of MADAM applied | OH value (KOH/g) | Amine value (meq/g) |
|---|---|---|---|---|---|
| M-35/MAD20 | M-35 | 80 | 20 | 78 | 1.3 |
| M-51/MAD20 | M-51 | 80 | 20 | 78 | 1.3 |
| M-19/MAD20 | M-19 | 80 | 20 | 78 | 1.3 |
| M-20/MAD20 | M-20 | 80 | 20 | 78 | 1.3 |
| M-21/MAD20 | M-21 | 80 | 20 | 78 | 1.3 |
| M-22/MAD10 | M-22 | 90 | 10 | 68 | 0.65 |
| M-22/MAD20 | M-22 | 80 | 20 | 78 | 1.3 |
| M-22/MAD30 | M-22 | 70 | 30 | 88 | 1.95 |
| M-542/MAD29 | M-542 | 80 | 20 | 78 | 1.3 |

Colloidal Dispersions of Blockcopolymer Modified Nanosilica in MAK

In this example modified nanoparticles are prepared by adding the blockcopolymer during the conversion of the aquasol via the alcohol into the 2-heptanone organosol phase.

Preparation AA 1 Up to 5: Modified Butyl-Nanosilica in 2-Heptanone 100 g of Nyacol2034 DI (containing 34 g of silica nanoparticle solids) was brought together with 300 g of ethanol and 200 g of n-butanol. From the mixture water was azeotropically removed by distillation under reduced pressure at 40° C. until a mass of 150 g of the colloidal dispersion was reached. 150 g 2-heptanone was then added and after mixing 20.4 g of a 50% of blockcopolymer M35/MAD20 in MAK was mixed in. The mass was again concentrated to 150 g. Once more 150 g of 2-heptanone was added and the distillation was performed to get a bluish colloidal dispersion of modified nano-silica in 2-heptanone with the code AA-1 and with a solid content (after 1 hour at 140° C.) of 35.6%.

In the same way the samples AA-2 up to 4 were made using different block copolymers described above. The modified nanosilica compositions are summarized in Table 3 below. In all cases an amount of 30 parts blockcopolymer solids versus 100 parts of silica nanosilica was applied.

TABLE 3

MODIFIED NANOPARTICLES

| Code of modified nanosilica | Type of blockcopolymer | Solid content in MAK (weight %) |
|---|---|---|
| AA-1 | M-35/MAD20 | 35.6 |
| AA-2 | M-20/MAD20 | 28.2 |
| AA-3 | M-21/MAD20 | 27.1 |
| AA-4 | M-22/MAD20 | 27.7 |

Preparation BB. Modified Butyl-Nanosilica in 2-Heptanone 165 g of Snowtex 0 (containing 33 g solids) was brought together with 600 g of ethanol and 400 g of n-butanol. From the mixture water was azeotropically removed by distillation under reduced pressure at 40° C. until a mass of 150 g of the colloidal dispersion was reached. 150 g 2-heptanone was then added and, after mixing, 19.8 g of a 50% of blockcopolymer M-51/MAD20 in MAK was mixed in. The mass was again concentrated to 150 g. 150 g of 2-heptanone was added and the distillation was performed to get a bluish colloidal dispersion of modified nano-silica in 2-heptanone with a solid content of (after 1 hour at 140° C.) of 19.8%.

Coating Composition Example 1A 3.58 g of the 50% blockcopolymer solution of M-19/MAD20 in 2-heptanone is further diluted with 22 g 2-heptanone and under stirring 22 g of the butyl-nanosilica in 2-heptanone (prepared according procedure B), is added. A 16.3% clear and thin viscous dispersion of blockcopolymer modified nanosilica is obtained. The applied ratio of blockcopolymer to silica was 30 to 100 solid parts respectively.

90 g of polyacrylate polyol Setalux 1770® VS-70 from Nuplex Resins is (under stirring) diluted with 7 g of ethyl 3-ethoxypropionate. To this Setalux 1770 solution is added 8.5 g of the 16.3% modified nanosilica. To the resulting nanosilica clear binder dispersion is subsequently added 30 g of Solvesso-100, 38.6 g of a butylated formaldehyde/melamine Setamine® US138 BB-70A and 1.8 g of Nacure® 5225 (an amine blocked strong acid from King Industries). 8 g of a 10% solution of Byk 358 (i.e. a polybutylacrylate) in 2-heptanone is finally added as leveling agent. On solid base 1 wt. % modified nanosilica on total resin solids was applied.

A film from the formulation in example 1A was drawn on Q-panels and on glass plates and, after a flash off of 10 min. at room temperature, cured for 24 minutes at 140° C.

Coating Composition Examples 1B to 1E

In the same way as described above M-19/MAD20, M-20/MAD20, M-21/MAD20, M-22/MAD20, RV-51/MAD20 blockcopolymers were tested in the examples 1B to 1E and compared with the reference being nanosilica unmodified with blockcopolymers. With TOF-SIMS the maximum of the silicium intensity (representative for the nanosilica) at the coating surface versus the silicium intensity in the bulk is determined. The ratio of Si surface maximum divided by the bulk Si intensity is the enrichment factor. An enrichment factor of less than 1 means that the surface is depleted with nanosilica. An enrichment factor above 1 means that the surface is enriched with nanosilica i.e. has a higher nanosilica content than the bulk. All films were clear. See Table 4 for the TOF-SIMS results.

TABLE 4

ToF-SIMS RESULTS SHOWING SURFACE ENRICHMENT

| Example 1 | Nanosilica modified with | Use of Byk358 | Enrichment factor according TOF-SIMS |
|---|---|---|---|
| A | M-19/MAD20 | Yes | 25 |
| B | M-20/MAD20 | Yes | 34 |
| C | M-20/MAD20 | No | 19 |
| D | M-21/MAD20 | Yes | 34 |
| E | M-22/MAD20 | Yes | 17 |
| Reference | Nothing | Yes | <1 |

Coating Composition Example 2

3.58 g of the 50% blockcopolymer solution of M-20/MAD20 in 2-heptanone is further diluted with 22 g 2-heptanone and under stirring 22 g of the butyl-nanosilica in 2-heptanone prepared according procedure B, is added. A 16.3% clear and thin viscous dispersion of modified nanosilica with hereon adsorbed blockcopolymer is obtained. The applied ratio of blockcopolymer to silica was 30 to 100 solid parts respectively.

100 g of polyacrylate polyol Setalux 17608 VB-64 from Nuplex Resins is (under stirring) diluted with 30 g of 2-heptanone. To this Setalux 1760 solution is added 7.0 g of the 16.3% modified nanosilica described above. To the resulting nanosilica clear binder dispersion is subsequently added 39.2 g of a butylated formaldehyde/melamine Setammel® US138 BB-70A. On solid base 1% modified nanosilica on total resin solids was applied. Using 35 g of the modified nanosilica instead of 7.0 g yields 6% modified nanosilica on total resin in Example 2B.

Films were drawn on Q-panels and on glass plates and after a flash off of 10 min. at room temperature cured for 24 minutes at 140° C. The clear films were tested with TOF-SIMS. Results are given in Table 5

TABLE 5

| Example 2 | Nanosilica modified with | % modified nanosilica on total resin solids | Enrichment factor according TOF-SIMS |
|---|---|---|---|
| A | M-20/MAD20 | 1 | 33 |
| B | M-20/MAD20 | 6 | 8 |
| Reference | No polymer | 1 | <1 |

Coating Composition Example 3

A clear premix was made of 90 g of polyacrylate polyol Setalux 1770® VS-70, 9 g of ethyl 3-ethoxypropionate and 4.4 g of butyl-nanosilica in MAK prepared according to preparation procedure A. In the quantities given in Table 5, 5% by weight of solutions of blockcopolymers from Table 1 were added to 10.34 g premix resulting in formulations 3 A to 3 F in a loading of 100 parts silica with 10 or 15 parts blockcopolymer. To each formulation was further added 3 g Solvesso, 3.86 g Setamine® US138 BB-70A, 180 mg Nacureo® 5225 and 400 mg of a 10% solution of Byk 358 in 2-heptanone. All formulations and films were clear. Table 6 summarizes the composition and TOF-SIMS results.

TABLE 6

| Example 3 | Mg of 5w % blockcopolymer added to the nanosilica/binder solution | Parts of copolymer on 100 parts silica | % modified nanosilica on total resin solids | Enrichment factor according TOF-SIMS |
|---|---|---|---|---|
| Reference | 0 mg polymer | None | 1 | <1 |
| A | 300 mg M-20/MAD20 | 15 | 1 | 16 |
| B | 300 mg M-22/MAD20 | 15 | 1 | 12 |
| D | 200 mg M-22/MAD20 | 10 | 1 | 4 |
| E | 200 mg M-51/MAD20 | 10 | 1 | <1 |

From this table one can conclude that no surface enrichment is obtained without modification or with modification with a not sufficient surface active blockcopolymer M51/MAD20.

Coating Composition Example 4

In this example 2 different types of AB blockcopolymers i.e. M-22/MAD20 and M-22/MAD30 with different MADAM length in block B and the same surface active part A were applied in combination with butyl nanosilica of preparation C (based on Snowtex 0). The composition and properties of the modified butyl-nanosilica samples S2 to S7 in table 7 are described. The modified butyl-nanosilica was prepared by mixing 11.4 g of the 22% butyl-silica in MAK together with a 50% solution of M-22/MAD30 in MAK. The modified nanosilica's were then introduced in a Setalux 1760 1 K system by diluting the Setalux 1760 with MAK (=2-heptanone), introducing and mixing then the modified nanosilica solution, and adding and mixing the Setamine US-138 and Byk additives. The quantities are given in Table 7. The percentage, solid modified nanosilica on total resin solids is in the range of 1.15 to 1.45%.

Coating compositions A up to F and the reference (0% silica) were sprayed onto Q-panels coated with a commercial primer and a commercial dark blue base coat. The base coat was applied in two layers with a 1 minute flash-off between the layers. The coating composition was applied after 5 minutes flash-off, also in two layers. After 10 minutes flash-off the complete system was baked for 30 minutes at 140° C. Dry Scratch resistance results obtained with the Crockmeter (method performed described above), are given in table 8. In all cases the modified nanosilica shows an improved scratch resistance. The highest gloss retention and the best appearance (haze on the level of the reference) however, is obtained for the compositions A, band C being based on the M-22/MAD20 blockcopolymer. A longer block of B with the basic aminogroup here leads to an inferior appearance.

TABLE 7

BLOCKCOPOLYMER MODIFIED NANOSILICA SAMPLES S2 TO S7 FOR EXAMPLE 4

| Composition | | REF | A | B | C | D | E | F |
|---|---|---|---|---|---|---|---|---|
| Nanosilica modified with x % blockcopolymer | | ref. | 15% | 30% | 45% | 15% | 30% | 45% |
| | % | | | M-22/MAD20 | | | M-22/MAD30 | |
| Setalux 1760 VB-64 | | 54.7 | 54.6 | 54.5 | 54.3 | 54.6 | 54.5 | 54.3 |
| MAK--» SC = 49% | | 25.6 | 24.4 | 24.4 | 24.3 | 24.4 | 24.4 | 24.3 |
| S2 | 23.7 | | 2.43 | | | | | |
| S3 | 25.3 | | | 2.57 | | | | |
| S4 | 26.6 | | | | 2.73 | | | |
| S5 | 23.7 | | | | | 2.43 | | |
| S6 | 25.3 | | | | | | 2.57 | |
| S7 | 26.6 | | | | | | | 2.73 |
| Setamine US-138 BB-70 | | 21.4 | 21.4 | 21.4 | 21.4 | 21.4 | 21.4 | 21.4 |
| BYK ®-310 (10% in MAK) | | 0.25 | 0.25 | 0.25 | 0.25 | 0.25 | 0.25 | 0.25 |
| BYK ®-315 | | 0.1 | | | | | | |
| Total: | | 102.0 | 103.1 | 103.1 | 103.1 | 103.1 | 103.1 | 103.1 |
| Solids content: | | 49.0 | 49.0 | 49.0 | 49.0 | 49.0 | 49.0 | 49.0 |
| Crockmeter results | | | | | | | | |
| Start gloss 20° | | 97.2 | 96.2 | 95.5 | 95.9 | 84.2 | 80.3 | 84.4 |
| Haze | | 10 | 14 | 9 | 9 | 149 | 177 | 149 |
| End gloss 20° | | 25.4 | 61.2 | 80.9 | 78.7 | 47.1 | 52.1 | 51.6 |
| % gloss retention | | 26.1 | 63.6 | 84.7 | 82.1 | 55.9 | 64.9 | 61.1 |

TABLE 8

COATING COMPOSITIONS A TO F AND CROCKMETER RESULTS FOR EXAMPLE 4

| Code silica/ blockcopolymer → | S2 | S3 | S4 | S5 | S6 | S7 |
|---|---|---|---|---|---|---|
| % polymer on silica → Blockco | 15% | 30% | 45% | 15% | 30% | 45% |
| | M-22/ MAD20 | M-22/ MAD20 | M-22/ MAD20 | M-22/ MAD30 | M-22/ MAD30 | M-22/ MAD30 |
| Applied g of BUTYL-SILICA in MAK (22% s.c) → | 11.4 | 11.4 | 11.4 | 11.4 | 11.4 | 11.4 |
| Added g of M-22/MAD20 in MAK (50% s.c.) → | 0.75 | 1.50 | 2.25 | | | |
| Added g of M-22/MAD30 in MAK (50% s.c) | | | | 0.75 | 1.50 | 2.25 |
| Total: | 12.1 | 12.9 | 13.6 | 12.1 | 12.9 | 13.6 |
| Solids content: | 23.7 | 25.3 | 26.6 | 23.7 | 25.3 | 26.6 |

Coating Composition Example 5

Nanosilica (according preparation BB) modified with the most polar blockcopolymer (M-51/MAD20 was tested in the Setalux 1760 1K in the same way as for example 4 in different contents Although some improvement was found at high contents, this modified nanosilica appeared less preferred than the more hydrophobic modfied M-22/MAD 20 of example 4. The composition and test results are summarised in Table 9.

TABLE 9

COMPOSITION AND TEST RESULTS OF THE COATING COMPOSITION OF EXAMPLE 5

| Composition | | REF | A | B | C | D |
|---|---|---|---|---|---|---|
| % of solid → Blockcopolymer M-51/ MAD20 modified silica on total resin solids | | 0% | 0.5% | 1% | 5% | 20% |
| | Solid content % | | | | | |
| gr of Setalux 1760 VB-64 | 64 | 36.46 | 36.38 | 36.30 | 35.68 | 33.33 |
| gr of MAK --» SC = 49% | | 17.04 | 16.09 | 15.08 | 6.95 | |
| gr of Preparation BB | 19.8 | | 1.09 | 2.19 | 10.94 | 43.77 |
| gr of Setamine US-138 BB-70 | 70 | 14.29 | 14.29 | 14.29 | 14.29 | 14.29 |
| gr of BYK-310 (10% in MAK) | | 0.17 | 0.17 | 0.17 | 0.17 | 0.17 |
| gr of BYK-315 | | 0.07 | | | | |
| Total: | | 68.0 | 68.0 | 68.0 | 68.0 | 91.6 |
| Solids content | | 49.0 | 49.2 | 49.5 | 51.5 | 43.7 |
| Crockmeter Results | | | | | | |
| Start gloss 20° | | 97.2 | 97.2 | 97.3 | 96.7 | 94.2 |
| Haze | | 9 | 9 | 9 | 11 | 13 |
| End gloss 20° | | 27.5 | 35.1 | 28.8 | 34.3 | 56.4 |
| % gloss retention | | 28.2 | 30.6 | 26.2 | 31.6 | 55.3 |

Coating Composition Example 6

The modified nanosilica of preparations AA 1 to AA 5 were formulated in Setalux 1760 1K resin and tested in the same way as in example 4. The composition, the Crockmeter results and additionally Carwash test results are presented in the Table 10 and Table 11. Car wash testing was performed according the Renault method discussed above.

TABLE 10

COMPOSITION AND CROCKMETER RESULTS FOR EXAMPLE 6 FORMULATIONS

| Composition of example 6 | | REF | A | B | C | D | E |
|---|---|---|---|---|---|---|---|
| % of solid Blockcopolymer modified silica on total resin solids | | ref. 0 | 0.5% | 0.5% | 0.5% | 20% | 0.5% |
| Preparation | | none | AA-2 | AA-3 | AA-4 | AA-4 | AA-1 |
| Type blockcopolymer | | — | M-20/ MA20 | M-21/ MA20 | M-22/ MA20 | M-22/ MA20 | M-35/ MA20 |
| Grammes of | Solid content % | | | | | | |
| Setalux 1760 VB-64 | 64 | 36.46 | 36.38 | 36.38 | 36.38 | 33.46 | 36.46 |
| MAK --»» SC = 49% | | 17.05 | 16.77 | 16.74 | 16.75 | 2.60 | 16.93 |
| AA-2 | 28.2 | | 0.77 | | | | |
| AA-3 | 27.1 | | | 0.80 | | | |
| AA-4 | 27.7 | | | | 0.78 | 31.22 | |
| AA-1 | 35.6 | | | | | | 0.60 |
| Setamine US-138 BB-70 | 70 | 14.29 | 14.29 | 14.29 | 14.29 | 14.29 | 14.29 |
| BYK-310 (10% in MAK) | | 0.17 | 0.17 | 0.17 | 0.17 | 0.17 | 0.17 |
| BYK-315 | | 0.07 | | | | | |
| Total: | | 68.0 | 68.4 | 68.4 | 68.4 | 81.7 | 68.4 |
| Total solids: | | 33.33 | 33.50 | 33.50 | 33.50 | 40.06 | 33.55 |
| Solids content: | | 49.0 | 49.0 | 49.0 | 49.0 | 49.0 | 49.0 |

TABLE 10-continued

COMPOSITION AND CROCKMETER RESULTS
FOR EXAMPLE 6 FORMULATIONS

| Composition of example 6 | REF | A | B | C | D | E |
|---|---|---|---|---|---|---|
| Crockmeter Results | | | | | | |
| Start gloss 20° | 97.4 | 96.4 | 96.1 | 95.9 | 91.9 | 94.7 |
| Haze | 9 | 9 | 9 | 9 | 9 | 9 |
| End gloss 20° | 33.3 | 80.0 | 82.6 | 84.2 | 85.4 | 84.3 |
| % gloss retention | 34.2 | 82.9 | 85.9 | 87.8 | 92.0 | 89.0 |

TABLE 11

COMPOSITION AND CARWASH RESULTS
FOR EXAMPLE 6 FORMULATIONS

| Composition of example 6 | | REF | A | D | E |
|---|---|---|---|---|---|
| % of solid Blockcopolymer modified silica on total resin solids | | ref. | 0.5% | 20% | 20% |
| Preparation | | none | AA-4 | AA-4 | AA-1 |
| Type blockcopolymer | | — | M-22/ MA20 | M-22/ MA20 | M-35/ MA20 |
| Grammes of | Solid content % | | | | |
| Setalux 1760 VB-64 | 64 | 36.46 | 36.38 | 33.46 | 33.48 |
| MAK --» SC = 49% | | 17.05 | 16.75 | 2.60 | 9.62 |
| AA-2 | 28.2 | | | | |
| AA-3 | 27.1 | | | | |
| AA-4 | 27.7 | | 0.78 | 31.22 | |
| AA-1 | 35.6 | | | | 24.07 |
| Setamine US-138 BB-70 | 70 | 14.29 | 14.29 | 14.29 | 14.29 |
| BYK-310 (10% in MAK) | | 0.17 | 0.17 | 0.17 | 0.17 |
| BYK-315 | | 0.07 | | | |
| Total: | | 68.0 | 68.4 | 81.7 | 81.6 |
| Total solids: | | 33.33 | 33.50 | 40.06 | 40.0 |
| Solids content: | | 49.0 | 49.0 | 49.0 | 49.0 |
| Carwash Results | | | | | |
| Start gloss 20° | | 97.4 | 95.9 | 91.9 | 85.0 |
| Haze | | 9 | 9 | 9 | 9 |
| End gloss 20° | | 72.8 | 77.7 | 76.7 | 78.3 |
| % loss of gloss | | 25.3 | 19.0 | 16.5 | 7.9 |

Coating Composition Example 7

As in example 4, 3 types of materials Z1 to Z3 were tested in resin, Setalux 1760 1K and compared with the reference without nanosilica. In Z1 and Z2 the type of blockcopolymer was the same but in Z2 commercial Nissan MIBK-ST organosol was used as base material for adsorption and in Z1 the butyl-silica in MAK according preparation C. Z1 and Z3 comprise the same type of nanosilica but contain M-20/MAD20 and M-542/MAD20, respectively. The latter is more hydrophobic. The tables 12 and 13 show the composition and Crockmeter results. Again a considerable improvement of the scratch resistance was feasible using 1.3% modified silica.

TABLE 12

ADSORBED BLOCKCOPOLYMER MODIFIED
NANOSILICA SAMPLES FOR EXAMPLE 7

| Code silica/blockcopolymer → | Z1 | Z2 | Z3 |
|---|---|---|---|
| % solid polymer on solid silica → | 30% | 30% | 30% |
| Type | M-20/ MAD20 | M-20/ MAD20 | M-542/ MAD20 |
| Applied g of BUTYL-SILICA in MAK (22% s.c) | 22.7 | | 22.7 |
| Applied g of Nissan MIBK-ST (30.5% s.c.) | | 16.4 | |
| Added g of M-20/MAD20 in MAK (50% s.c.) | 3.0 | 3.0 | |
| Added g of M-542/MAD20 in MAK (50% s.c) | | | 3.0 |
| MAK | 0.3 | 6.6 | 0.3 |
| Total: | 26.0 | 26.0 | 26.0 |
| Solids content: | 25.0 | 25.0 | 25.0 |

TABLE 13

COMPOSITION AND CROCKMETER
RESULTS FOR EXAMPLE 7

| Composition | REF | A | B | C |
|---|---|---|---|---|
| 1.3% solid modified nanosilica in total resin solids | | | | |
| Setalux 1760 VB-64 | 54.7 | 54.5 | 54.5 | 54.5 |
| MAK --» SC = 49% | 25.6 | 24.3 | 24.3 | 24.3 |
| Z1 | | 2.60 | | |
| Z2 | | | 2.60 | |
| Z3 | | | | 2.60 |
| Setamine US-138 BB-70 | 21.4 | 21.4 | 21.4 | 21.4 |
| BYK ®-310 (10% in MAK) | 0.25 | 0.25 | 0.25 | 0.25 |
| BYK ®-315 | 0.1 | | | |
| Total: | 102.0 | 103.1 | 103.1 | 103.1 |
| Solids content: | 49.0 | 49.0 | 49.0 | 49.0 |
| Crockmeter results | | | | |
| Start gloss 20° | 96.9 | 96.9 | 96.2 | 93.2 |
| haze | 9 | 9 | 9 | 29 |
| End gloss 20° | 17.8 | 37.3 | 57.6 | 70.9 |
| % gloss retention | 18.4 | 38.5 | 59.9 | 76.1 |

Coating Composition Example 8

In this example the coating composition comprises coating resin Setalux 1770 with the Setamine US138 and modified nanosilica in MAK x1 and x2 modified with 2 different types of blockcopymer, i.e. M-19/MAD20 and M-20/MAD20. Composition and Crockmeter results for the sprayed and cured composition is given in the tables 14 and 15.

TABLE 14

ADSORBED BLOCKCOPOLYMER/NANOSILICA SAMPLES FOR EXAMPLE 8

| Code silica/blockcopolymer → | X1 | X2 |
|---|---|---|
| % solid polymer on solid silica → | 30% | 30% |
| Type | M-19/MAD20 | M-20/MAD20 |
| Applied g of BUTYL-SILICA in MAK (22% s.c) | 22.7 | 22.7 |
| Added g of M-19/MAD20 in MAK (50% s.c.) | 3.0 | |
| Added g of M-20/MAD20 in MAK (50% s.c) | | 3.0 |
| Total: | 25.7 | 25.7 |
| Solids content: | 25.3 | 25.3 |

TABLE 15

COMPOSITION AND CROCKMETER RESULTS FOR EXAMPLE 8

| Composition | REF | A | B |
|---|---|---|---|
| 1.3% solid modified nanosilica in total resin solids | | | |
| Setalux 1770 VS-70 | 56.0 | 49.8 | 49.8 |
| MAK--» SC = 51% | 26.3 | 25.0 | 25.0 |
| X1 | | 2.57 | |
| X2 | | | 2.57 |
| Setamine US-138 BB-70 | 21.4 | 21.4 | 21.4 |
| Nacure 5225 | 0.50 | 0.50 | 0.50 |
| BYK ®-310 (10% in MAK) | 0.25 | 0.25 | 0.25 |
| BYK ®-315 | 0.1 | | |
| Total: | 98.5 | 99.5 | 99.5 |
| Solids content: | 50.7 | 50.7 | 50.7 |
| Crockmeter results | | | |
| Start gloss 20° | 92.0 | 89.4 | 88.9 |
| haze | 8 | 8 | 9 |
| End gloss 20° | 56.4 | 83.2 | 83.7 |
| % gloss retention | 61.3 | 93.0 | 94.1 |

Comparative Coating Composition Example 9

This comparative example illustrates the superiority of segmented polymers over random/statistical polymers.

It has been found that segmented polymers provide an improved scratch resistance and improved appearance for coatings when compared to random copolymers. Without wishing to be bound by theory, the origin of the improvement is believed to result from a more efficient steric stabilisation of the nanoparticles by the segmented copolymers. The greater stabilisation leads to less aggregation tendency. In a random copolymer the adsorbing functional groups are distributed over the whole chain so that bridging between two or more particles can occur more easily leading to agglomeration of the particles.

Preparation of the at Random Copolymer for Use in Comparative Example 9

A reaction vessel for producing acrylic resin, which was equipped with a stirrer, thermometer and a reflux condensing tube was charged with a homogenous mixture of 61.35 g alpha-methyl-styrenedimer (AMSD), 29.63 g of butyl-methacrylate (BuMA), 18.04 g of 2-hydroxypropyl-methacrylate (HPMA), 9.91 g 2-ethylhexylmethacylate (EHMA) and 12.66 g of 2-(dimethylamino)ethylmethacrylate (MADAM). The vessel was heated under stirring and brought at 145° C. while nitrogen-substituting the inside atmosphere of the reaction vessel. While maintaining the temperature at 145° C. over a period of 5 hours, a mixture was dosed of 267.14 g of butylmethacrylate, 155.58 g 2-hydroxypropylmethacrylate, 89.13 g of ethylhexylmethacrylate, 113.94 g of 2-(dimethylamino)ethylmethacrylate (MADAM) and 11.62 g Perkadox AMBN (i.e. 2,2-Azodi(2-methyl-butyronitrile). Thereafter, over 30 minutes 1.17 g Perkadox AMBN dissolved in 31.90 g 2-heptanone was added. The material was cooled down and 738.3 g 2-heptanone was added in order to obtain a 50% solution of the at random polymer. The at random made copolymer is then cooled down to room temperature. It has an OH value expressed as amount of KOH/g of 78 and an amine value of 1.3 meq/g. The content and types of the different monomers of the random copolymer so prepared are the same as for the blockcopolymer M-19/MAD20 but the amine containing monomer is now randomly distributed in the polymer.

Comparative Coating Composition Example 9

A coating composition was made up comprising a coating resin Setalux 1770 with Setamine US138 and modified nanosilica in MAK w1 and w2 modified with 2 different types of copolymer, i.e. the M-19/MAD20 blockcopolymer and the above described random copolymer. Composition and Crockmeter results for the sprayed and cured composition are given in the tables 16 and 17. It is clearly shown in the tables that a lower scratch resistance but also a worse film appearance is found when using the random copolymer in comparison to the blockcopolymer.

TABLE 16

ADSORBED BLOCKCOPOLYMER VERSUS THE AT RANDOM COPOLYMER/NANOSILICA SAMPLES FOR EXAMPLE 9

| Code silica/copolymer → | W1 | W2 |
|---|---|---|
| % solid polymer on solid silica → | 30% | 30% |
| Type | M-19/MAD20 | Random copolymer |
| Applied g of BUTYL-SILICA in MAK (22% s.c) | 22.7 | 22.7 |
| Added g of M-19/MAD20 in MAK (50% s.c.) | 3.0 | |
| Added g of RANDOM polymer in MAK (50% s.c) | | 3.0 |
| MAK | 6.8 | 6.8 |
| Total: | 32.5 | 32.5 |
| Solids content: | 20.0 | 20.0 |

TABLE 17

COMPOSITION AND CROCKMETER RESULTS FOR EXAMPLE 9

| Composition | A | B |
|---|---|---|
| 1.3% solid modified nanosilica in total resin solids | | |
| Setalux 1770 VS-70 | 49.8 | 49.8 |
| MAK--» SC = 51% | 23.8 | 23.8 |
| W1 | 3.25 | |
| W2 | | 3.25 |
| Setamine US-138 BB-70 | 21.4 | 21.4 |

TABLE 17-continued

COMPOSITION AND CROCKMETER RESULTS FOR EXAMPLE 9

| Composition | A | B |
|---|---|---|
| Nacure 5225 | 0.50 | 0.50 |
| BYK ®-310 (10% in MAK) | 0.25 | 0.25 |
| Total: | 99 | 99 |
| Solids content: | 51 | 51 |
| Crockmeter results | | |
| Start gloss 20° | 90 | 91 |
| haze | 6 | 12 |
| End gloss 20° | 85.1 | 67.1 |
| % gloss retention | 93.1 | 70.3 |

We claim:

1. Modified nanoparticles comprising colloidal amorphous silica nanoparticles having an average diameter between 1 and 400 nanometers having adsorbed thereon a segmented copolymer, comprising an adsorbing segment and a hydrophobic surface active segment, wherein the adsorbing segment has one or more functional groups that adsorb on the nanoparticles, wherein the amount of copolymer on the nanoparticles is at most 100 wt % (relative to the total solid weight of the nanoparticles) and wherein the particle surface is esterified with mono-alcohol by chemical reaction between the hydroxyl groups of the alcohol and the silanol groups (Si—OH) of the amorphous colloidal silica particles.

2. Modified nanoparticles according to claim 1, wherein the nanoparticles are amorphous silica nanoparticles and wherein the segmented copolymer is an A-B blockcopolymer produced by controlled radical polymerization producing a hydrophobic macromonomer block forming the surface active hydrophobic segment and a block having one or more basic functional groups.

3. Modified nanoparticles according to claim 2, wherein the segmented copolymer comprises crosslinkable groups.

4. The modified nanoparticles of claim 1, wherein the segmented copolymer comprises a blockcopolymer or a graft copolymer.

5. A film forming composition comprising a resin and the modified nanoparticles of claim 1.

6. A scratch resistant coating, comprising a film forming composition comprising the modified nanoparticles according to claim 1, wherein the modified nanoparticles are enriched at the surface of the coating.

7. The scratch resistant coating according to claim 6, wherein the coating is a clear coating.

* * * * *